UNITED STATES PATENT OFFICE.

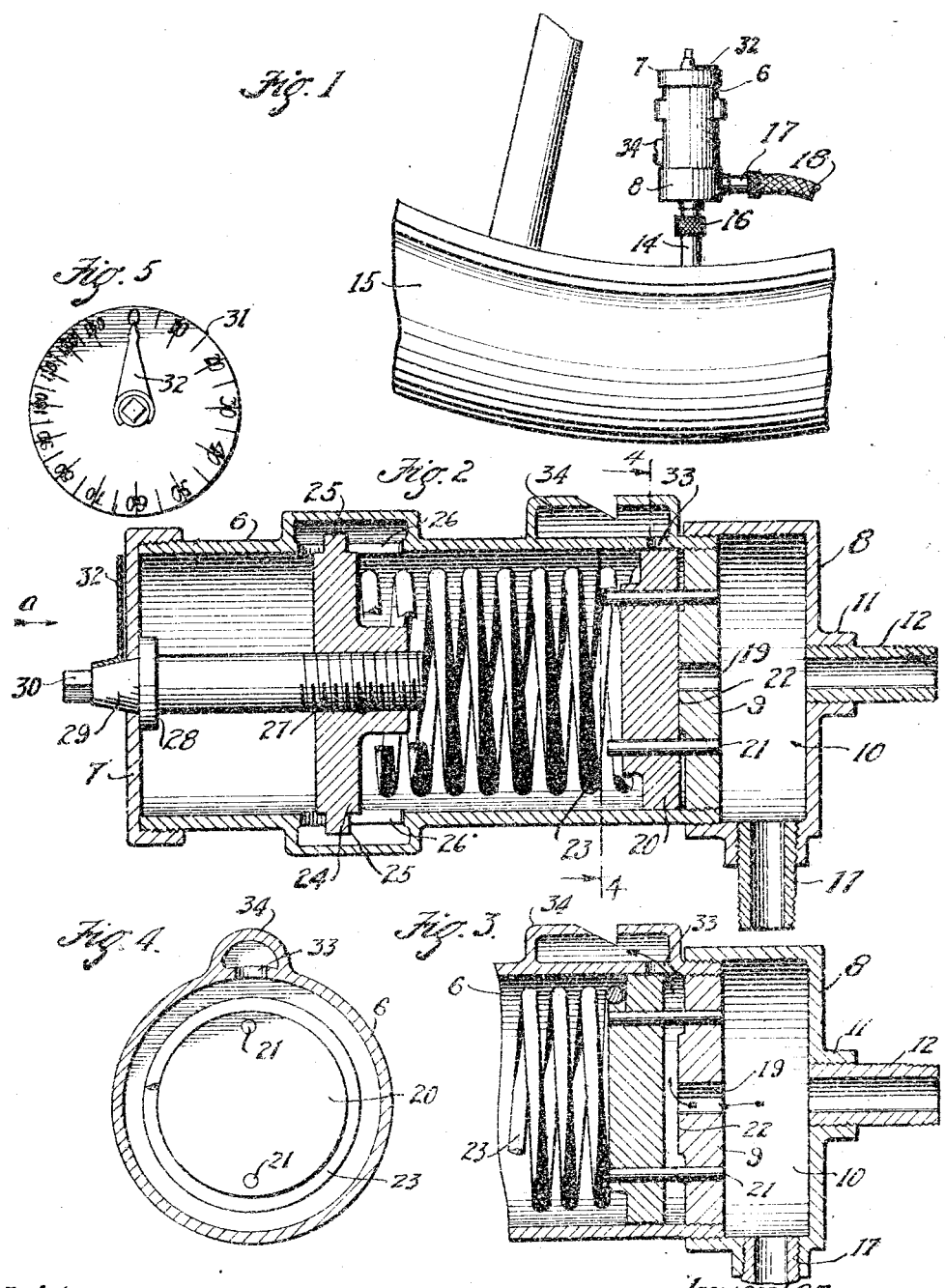

PAUL E. DURHAM, OF LOS ANGELES, CALIFORNIA.

PRESSURE-INDICATOR.

1,176,703.   Specification of Letters Patent.   Patented Mar. 21, 1916.

Application filed February 2, 1914. Serial No. 815,959.

*To all whom it may concern:*

Be it known that I, PAUL E. DURHAM, a citizen of the United States, residing at Los Angeles, in the county of Los Angeles, State of California, have invented new and useful Improvements in Pressure-Indicators, of which the following is a specification.

This invention relates to a pressure indicator, and particularly pertains to an indicator device for attachment to the valve stem of a pneumatic tire for indicating the extent of air pressure delivered to the tire.

It is the object of this invention to provide an indicator of the above description which will enable a person to inflate a pneumatic tire to a determined pressure, which indicator will automatically indicate by an audible signal when the predetermined amount of pressure is reached.

Another object is to provide means for adjusting the indicator so that the signal will be sounded according to the pressure required.

The invention primarily resides in a closed cylindrical casing having an apertured partition adjacent one end thereof to form an air chamber, means for connecting said chamber with the valve stem of a tire and to a source of air supply, a piston in said casing, adjustable spring means for normally maintaining said piston in an advanced position to close the aperture in the partition, and means whereby the retraction of said piston by air pressure in the chamber will cause the sounding of an audible signal.

The invention is illustrated in the accompanying drawings, in which:

Figure 1 is a side view of the indicating device showing it applied. Fig. 2 is a longitudinal section of the device partly in elevation, showing it disposed at right angles to the position shown in Fig. 1 and illustrating it with its parts in their respective positions. Fig. 3 is a detail section of one end of the device, corresponding to Fig. 2, showing the piston in a retracted position to open communication between the air chamber and a whistle. Fig. 4 is a detail section on the line 4—4 of Fig. 2. Fig. 5 is a detail end view of the device on a reduced scale as seen in the direction of the arrow —a— in Fig. 2, showing the graduations thereon.

More specifically in the drawings, 6 indicates a cylindrical casing which is threaded externally at both ends to receive end caps 7 and 8 and is threaded internally at the end on which the cap 8 is mounted to receive an externally threaded plate 9 adapted to be spaced from the inner end wall of the cap 8 and constitutes a partition in the casing 6 to form a chamber 10 in the latter. The cap 8 is provided with a boss 11 having a threaded opening therein to receive a nipple 12 adapted to be attached to the valve stem 14 of a pneumatic tire 15 by means of a threaded connection 16. A nipple 17 is secured in the peripheral edge of the cap 8 and is adapted to be connected to a flexible hose 18 leading from any suitable source of fluid pressure supply. The chamber 10 is thus adapted to be interposed in the path of air under pressure passing from the source of supply to the tire.

The partition plate 9 is formed with a central aperture 19 which is normally closed by means of a piston valve 20 reciprocally mounted in the casing 6. The valve 20 is in the form of a disk having perforations therein to receive pins 21 projecting from the inner face of the partition plate 9, on which pins the disk 20 is reciprocated and guided. The outer face of the piston 12 is held in normal contact with a rim or seat 22 on the partition plate 9 surrounding the aperture 19, by means of a spiral spring 23 which bears between the inner face of the piston valve 20 and an adjustable bearing plate 24 slidably mounted in the casing 6. The plate 24 is held against rotation in the casing 6 by means of projections 25 on its peripheral edge which slidably engage longitudinally extending slots or grooves 26 formed in the casing 6, and is provided with an internally threaded opening adapted to receive a threaded stem 27. The outer end of the stem 27 is formed with a shoulder 28 adapted to abut against the inner face of the cap 8 and has a conical extension 29 which passes through an opening in the end plate 7 and carries a squared portion 30 to receive a wrench or other tool by means of which the stem may be rotated to advance or retract the bearing plate 24, by which adjustment of the plate 24 the tension of the spring 23 may be regulated.

The outer face of the cap 7 is formed with graduations 31 to indicate various degrees of tension of the spring 23 according to the state of compression of the latter, and rigidly mounted on the conical portion 29 of the stem 27 is a pointer 32 which registers with the graduations 31 to indicate the pressure of the spring in pounds according to the position of the threaded stem 27 and the plate 24. The peripheral edge of the piston valve 20 normally closes a port 33 leading to a whistle 34 formed on the casing 6.

In the operation of the invention the device is attached to the valve stem 14 and is connected to the tube 18 leading from any suitable source of pressure supply, as shown in Fig. 1. The air pressure, on being delivered from the tube 18, passes through the chamber 10 and enters the tire 15 through the valve 14, the latter operating to trap the air in the tire in the usual manner. The air pressure in the chamber 10 will bear against the piston valve 20 through the aperture 19 tending to force the piston valve 20 rearwardly in opposition to the spring 23, which has previously been set by adjusting the stem 27 to oppose a predetermined pressure corresponding to the pressure desired in the tire 15. For instance, assuming that it is desired to inflate the tire 15 to a pressure of sixty pounds, the stem 20 will be rotated to position on the indicator 32 in register with the graduation designated by 60, which operation adjusts the bearing plate 24 to tension the spring 23 so that the latter will exert a sixty pound pressure on the piston valve 20. When the air pressure in the chamber 10 reaches sixty pounds or a trifle thereover, due to the resistance offered by the pressure in the tire 15 to the introduction of additional air therein, the piston 20 will be reciprocated on the guide pins 21 in opposition to the spring 23 by reason of the pressure exerted by the latter being overcome by excessive pressure of air against the piston. On the initial rearward movement of the piston valve 20 the port 32 will be opened to the space between the piston valve and the partition 9 as indicated in Fig. 3, whereupon air under pressure will pass from the chamber 10 through the aperture 19 and port 32 through the whistle, thereby sounding the latter, and thus signaling that the pressure of air in the tire has reached the required amount.

From the foregoing it will be seen that I have provided a device which is substantial in construction and efficient and reliable in operation, and which can be readily applied.

What I claim is:

In a pressure indicator, the combination of a cylinder having longitudinal slots, a partition wall spaced from one end thereof to form a pressure chamber, and having an opening therein, a plurality of studs carried by said partition, a valve slidably mounted on said studs, a bearing plate slidably mounted in the cylinder having lugs on its diametrically opposite sides slidably engaging said longitudinal slots, a threaded stem engaging said plate having its outer end projecting through the end of the cylinder and adapted to be rotated to vary the position of the bearing plate, a pointer secured to said stem for indicating pressure, and a coil spring interposed between said bearing plate and valve to retain the latter in its seated position to normally close a port in the cylinder walls.

In witness that I claim the foregoing I have hereunto subscribed my name this 19th day of January, 1914.

PAUL E. DURHAM.

Witnesses:
MARGUERITE BATES,
MARIE BACTEY.